United States Patent
Bao et al.

(10) Patent No.: US 9,426,373 B2
(45) Date of Patent: Aug. 23, 2016

(54) WHITEBOARD ACTIVITY NOISE DETECTION SYSTEM FOR IMMERSIVE TELEPRESENCE SYSTEMS

(71) Applicant: Cisco Technology, Inc., San Jose, CA (US)

(72) Inventors: Feng Bao, Sunnyvale, CA (US); Subrahmanyam Venkata Kunapuli, Fremont, CA (US); Fei Yang, San Jose, CA (US); Tor Sundsbarm, San Jose, CA (US); David Paul Wunsch Desrosiers, Los Gatos, CA (US); Olin Daniel Williford, Jr., Plano, TX (US); David Michael Sanguinet, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 343 days.

(21) Appl. No.: 14/096,885

(22) Filed: Dec. 4, 2013

(65) Prior Publication Data
US 2015/0156395 A1    Jun. 4, 2015

(51) Int. Cl.
*H04N 7/15* (2006.01)
*H04N 5/232* (2006.01)

(52) U.S. Cl.
CPC ........... *H04N 5/23296* (2013.01); *H04N 5/232* (2013.01)

(58) Field of Classification Search
USPC ...................................................... 348/14.08
See application file for complete search history.

(56) References Cited

U.S. PATENT DOCUMENTS

| 7,729,520 | B2* | 6/2010 | Kempf | G06K 9/00154 178/19.01 |
|---|---|---|---|---|
| 8,332,755 | B2 | 12/2012 | Zhang et al. | |
| 8,355,892 | B2 | 1/2013 | Kvavle et al. | |
| 9,001,183 | B2* | 4/2015 | Mauchly | H04N 7/15 348/14.1 |
| 2004/0263646 | A1* | 12/2004 | Cutler | H04N 1/19594 348/239 |
| 2008/0012936 | A1 | 1/2008 | White | |
| 2009/0046139 | A1* | 2/2009 | Cutler | H04N 7/15 348/14.08 |
| 2010/0097441 | A1 | 4/2010 | Trachtenberg et al. | |
| 2010/0261466 | A1* | 10/2010 | Chang | G06F 3/1423 455/420 |
| 2011/0242059 | A1* | 10/2011 | Pasquero | G06F 3/0233 345/177 |
| 2012/0229589 | A1* | 9/2012 | Barrus | H04N 7/147 348/14.08 |
| 2015/0156395 | A1* | 6/2015 | Bao | H04N 5/23296 348/345 |
| 2015/0169069 | A1* | 6/2015 | Lo | G06F 3/017 715/753 |
| 2015/0172562 | A1* | 6/2015 | Mauchly | H04N 5/2628 348/14.08 |

OTHER PUBLICATIONS

A. Davis & I. Weinstein, Collaboration within the Telepresence Experience, Jan. 2010,www.ivci.com/pdf/whitepaper-collaboration-within-the-telepresence-experience-wainhouse.pdf.

* cited by examiner

Primary Examiner — Creighton Smith
(74) Attorney, Agent, or Firm — P. Su

(57) ABSTRACT

In one embodiment, a method includes obtaining a first signal from a first microphone, and determining when the first signal is indicative of activity on a first surface. The method also includes controlling a camera to focus on the first surface when it is determined that the first signal indicates the activity on the first surface. In such an embodiment, the first microphone and the camera may be part of a collaboration system, and the first surface may be a surface of a whiteboard.

20 Claims, 11 Drawing Sheets

WHITEBOARD ACTIVITY NOISE DETECTION SYSTEM FOR IMMERSIVE TELEPRESENCE SYSTEMS

TECHNICAL FIELD

The disclosure relates generally to conferencing systems. More particularly, the disclosure relates to allowing a determination to be made as to when there is activity on a whiteboard during a telepresence session such that a camera may efficiently focus on the whiteboard when there is activity on the whiteboard.

BACKGROUND

The use of collaborative systems, e.g., conferencing systems such as immersive telepresence systems, enables parties who are not at the same physical location to efficiently assemble such that information may be shared. Many conference sessions include the use of a whiteboard which allows one participant in a conference session to write on the whiteboard while other participants in the conference session may see what is written on the whiteboard. When a conference session includes at least one participant who is participating from a remote location, e.g., is not in the same room as a whiteboard that is in use, a camera may focus and zoom in on the whiteboard so that the participant who is participating from the remote location may view the whiteboard.

A whiteboard may generally be an important feature of an immersive telepresence system. However, as a whiteboard may not be in use all the time during a session, a camera within an immersive telepresence session may be controlled to zoom in on the whiteboard substantially only when the whiteboard is in use. While a camera may be manually controlled by a user interface device to zoom in on the whiteboard when the whiteboard is in use, it is often inefficient for an individual to be responsible for manually controlling the camera.

Many immersive telepresence systems include a microphone that is specifically positioned to pick up sound in the vicinity of the whiteboard. In some instances, when a microphone positioned near a whiteboard detects voice activity, the camera may be automatically controlled to zoom in on the whiteboard. However, as an individual talking near the whiteboard may not necessarily be writing or drawing on the whiteboard, zooming in on the whiteboard when voice activity is detected at the whiteboard may not be effective in efficiently zooming in on the whiteboard when the whiteboard is in use.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1A:
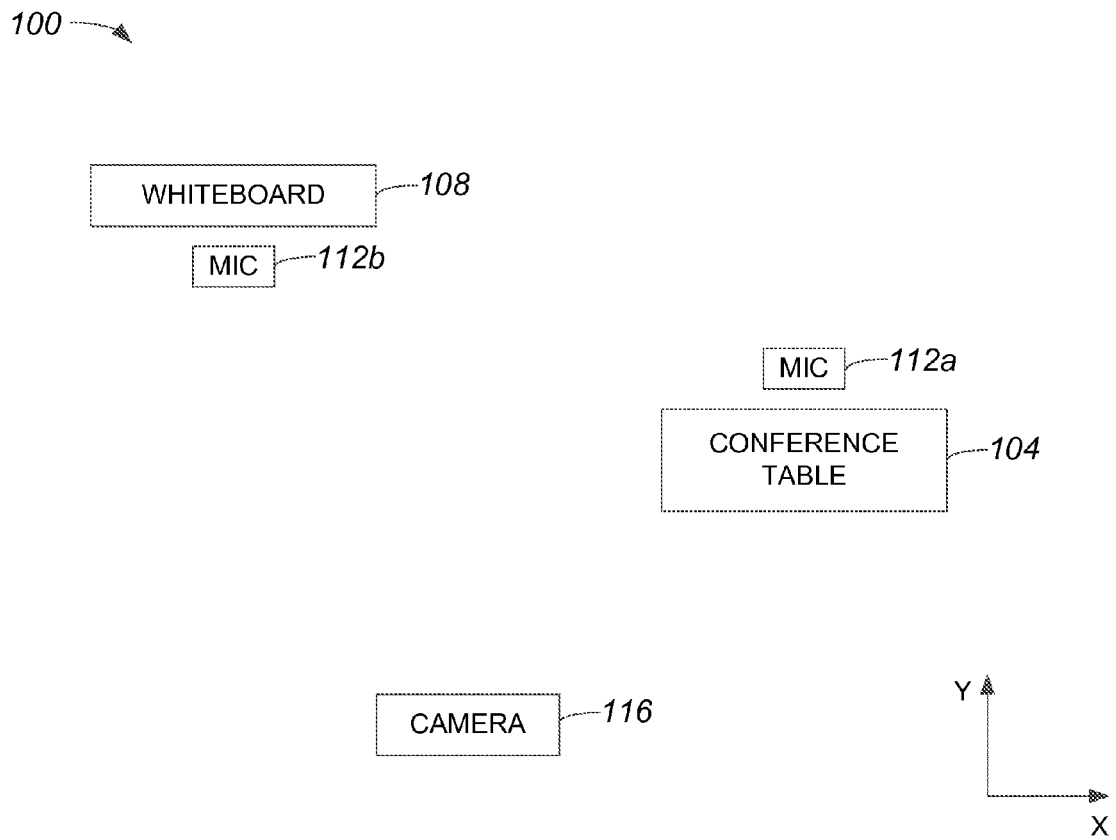
FIG. 1A is a diagrammatic representation of an environment suitable for a telepresence session which includes a whiteboard and a plurality of microphones in accordance with an embodiment.

According to one aspect, a method includes obtaining a first signal from a first microphone, and determining when the first signal is indicative of activity on a first surface. The method also includes controlling a camera to focus on the first surface when it is determined that the first signal indicates the activity on the first surface. In one embodiment, the first microphone and the camera are part of a collaboration system, and the first surface is a surface of a whiteboard.

Description

Many collaboration systems, e.g., immersive telepresence systems, utilize whiteboards to present and to share information. Whiteboards may generally include, but are not limited to including, marker boards, dry-erase boards, and/or any suitable surface on which writing instruments, e.g., markers or pens, may be used to write. A camera of a collaboration system is often used to film a location that is associated with the collaboration session such that remote participants in the collaboration session, e.g., participants who are virtually attending the collaboration session, may effectively see what is happening at the location. A whiteboard at a location that is associated with a collaboration system may be captured or otherwise recorded by a camera when the whiteboard is in use such that remote participants in the collaboration system may see information that is being presented on the whiteboard.

Accurately determining when a whiteboard is in use during a collaboration session allows a camera focus on or zoom in on the whiteboard substantially only when the whiteboard is in use, and may reduce the likelihood of the camera focusing on or zooming in on the whiteboard when there is no actual activity with respect to the whiteboard. When a user of a whiteboard, e.g., a presenter, uses a whiteboard during a presentation, the user may draw on a surface of the whiteboard, write on the surface of the whiteboard, and/or erase the surface of the whiteboard. Drawing, writing, and erasing activities may cause specific noises, and those specific noises may be captured or otherwise picked up by a microphone. The noises captured by the microphone are processed using audio signal processing methods, and if the processing identifies drawing, writing, and erasing activities relating to a whiteboard, then a camera may zoom in on the whiteboard.

In one embodiment, when noise activity is detected with respect to a surface of a whiteboard during a collaboration session, a camera may zoom in on the whiteboard. Noise activity that is detected with respect to a surface of a whiteboard includes erasing noise, e.g., noise associated with swiping an eraser along the surface of the whiteboard, and writing noise, e.g., noise associated with a writing instrument contacting the surface of the whiteboard when writing and/or drawing occurs.

By detecting noise activity on the surface of a whiteboard, a collaboration system such as an immersive telepresence system may more accurately determine when the whiteboard is in use. Noise activity on the surface of a whiteboard generally only occurs when someone is writing on the whiteboard or erasing the whiteboard and, as such, when a camera zooms in on the surface of the whiteboard when noise activity is detected, there is a relatively high probability that the whiteboard is in use. It should be appreciated that noise associated with writing on a surface of a whiteboard may generally include noise associated with drawing on the surface of the whiteboard.

Referring initially to FIG. 1A, a location suitable for a collaboration session such as an immersive telepresence session will be described in accordance with an embodiment. An environment or location 100, e.g., a conference room, generally includes a conference table 104, a whiteboard 108, and a camera 116. Typically, a conference table 104 may be arranged such that multiple participants in a collaboration session may sit around conference table 104. It should be appreciated, however, that in lieu of sitting around conference table 104, participants may instead sit in a seating area (not shown) or in rows of chairs (not shown) at location 100. In other words, location 100 is not limited to including conference table 104, and may generally include any suitable arrangement, e.g., rows of chairs, which allow participants in the collaboration session to gather.

Location 100 generally includes a plurality of microphones 112a, 112b. In the embodiment as shown, microphone 112a is arranged to pick up sound in the vicinity of conference table 104, while microphone 112b is arranged to pick up sound near whiteboard 108. As will be appreciated by those skilled in the art, microphone 112a may also pick up sound from whiteboard 108, and microphone 112b may also pick up sound from conference table 104. That is, while microphone 112a is generally positioned to capture sounds from near conference table 104, microphone 112a may also capture other sounds, e.g., sounds from other areas within location 100. Similarly, while microphone 112b is generally positioned to capture sounds from near whiteboard 108, microphone may also capture other sounds. However, microphone 112a may be considered to be an array microphone arranged to capture sound activity from near conference table 104, and microphone 112b may be considered to be a whiteboard microphone arranged to capture sound activity from near whiteboard 108.

Microphones 112a, 112b and camera 116 may generally be part of an overall collaboration system which supports a collaboration session. By way of example, microphones 112a, 112b may capture sounds during a collaboration session, and camera 116 may capture images during the collaboration session. The captured sounds and images may be provided to a server (not shown) arranged to process the captured sounds and images, e.g., to determine when there is activity on whiteboard 108. Camera 116, which may be controlled based on where activity occurs at location 100, may be arranged to zoom in on, or otherwise focus on, whiteboard 108 when activity is detected on whiteboard 108. For example, when microphone 112b detects noise activity such as writing noise or erasing noise, camera 116 may move or otherwise be adjusted to zoom in on whiteboard 108, as activity is effectively detected on whiteboard 108.

Figure 1B:
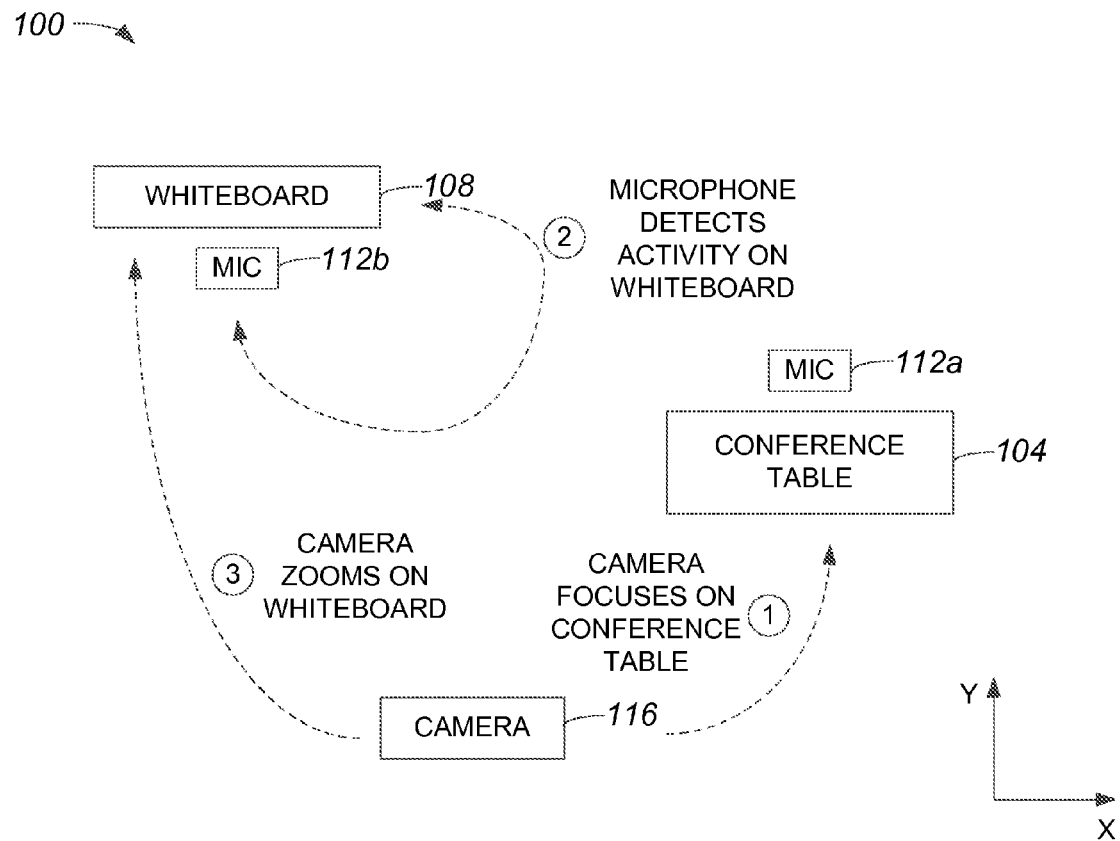
FIG. 1B is a diagrammatic representation of a process of a camera focusing on a whiteboard during a telepresence session based upon detected activity on a whiteboard in accordance with an embodiment.

FIG. 1B is a diagrammatic representation of a process of a camera focusing on a whiteboard during a collaboration session associated with a location, e.g., location 100 of FIG. 1A, based upon detected activity on a whiteboard in accordance with an embodiment. At a time t1, a collaboration session such as an immersive telepresence session is in progress, and camera 116 is focused on conference table 104. During the course of the collaboration session, microphone 112b detects activity on whiteboard 108 at a time t2. Activity on whiteboard 108, e.g., activity on a writing surface of whiteboard 108, may effectively be detected by microphone 112b, or by a server (not shown) which analyzes sound data provided by microphone 112b, when noise activity such as erasing noise or writing noise is identified or perceived. Once activity on whiteboard 108 is detected, camera 116 switches from focusing on the conference table to zooming in on or otherwise focusing on whiteboard 108 at a time t3.

Figure 2:
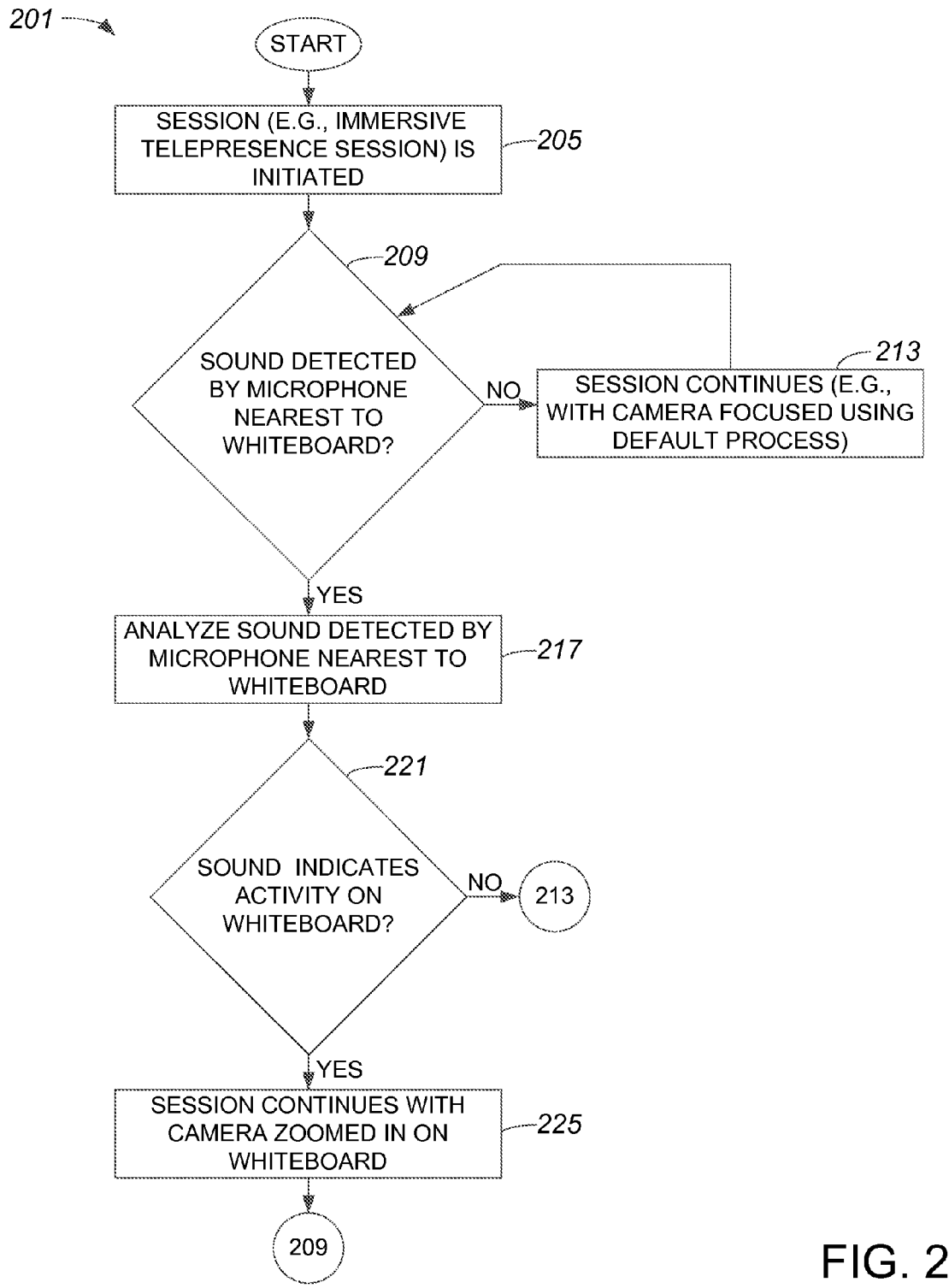
FIG. 2 is a process flow diagram which illustrates a method of using a camera during a telepresence session such that a determination of whether the camera is to focus on a whiteboard is based on whether there is activity on the whiteboard in accordance with an embodiment.

With reference to FIG. 2, an overall method of managing a session, as for example an immersive telepresence session, will be described in accordance with an embodiment. A method 201 of managing a session begins at step 205 in which a session is initiated 205. Initiating a session may include, but is not limited to including, dialing into a conference bridge. In the described embodiment, the session includes at least one party that participates in the session from a location that includes a whiteboard and a plurality of microphones.

Once the session is initiated, a determination is made in step 209 as to whether sound is detected by the microphone located nearest to the whiteboard, or a whiteboard microphone. If the determination is that there is no sound, or an insignificant amount of sound, detected by the whiteboard microphone, then the session continues in step 213. It should be appreciated that the session may continue such that the camera is focused using a default process, e.g., the camera may be focused on parties around a conference table unless it is determined that there is activity on the whiteboard. From step 213, process flow returns to step 209 in which it is determined if sound is detected by the whiteboard microphone.

Alternatively, if it is determined in step 209 that there is sound detected by the whiteboard microphone, the sound is analyzed in step 217. One method of analyzing sound detected by the whiteboard microphone will be discussed with respect to FIG. 3. After the sound detected by the whiteboard microphone is analyzed, it is determined in step 221 whether the sound indicates that there is activity on the whiteboard. That is, it is determined in step 221 whether erasing noise or writing noise is indicated. If it is determined that the sound does not indicate activity on the whiteboard, then the indication is that there is that the whiteboard is not currently in use during the session. As such, process flow moves to step 213 in which the session continues with the camera focused using a default process.

If, on the other hand, it is determined in step 221 that sound detected by the whiteboard microphone indicates activity on the whiteboard, then the session continues in step 225 with the camera zoomed in on or focused on the whiteboard. Once the camera is zoomed in on the whiteboard, process flow returns to step 209 in which it is determined if sound continues to be detected by the whiteboard microphone.

Figure 3:
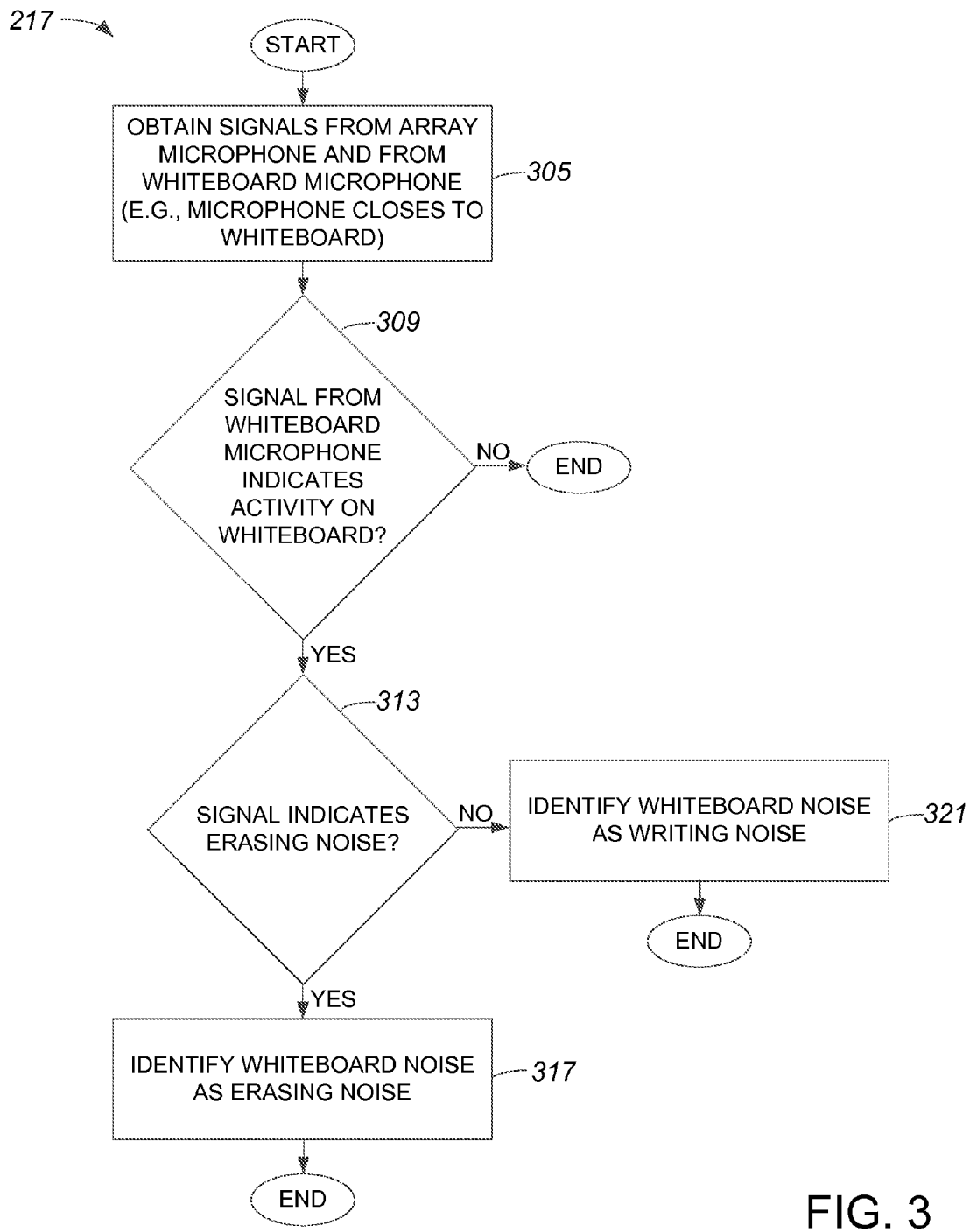
FIG. 3 is a process flow diagram which illustrates a method of analyzing sound detected by a microphone that is near a whiteboard, e.g., step 217 of FIG. 2, in accordance with an embodiment.

With reference to FIG. 3, a method of analyzing sound detected by a whiteboard microphone, e.g., step 217 of FIG. 2, will be described in accordance with an embodiment. A method 217 of analyzing sound detected by a whiteboard microphone begins at step 305 in which signals from an array microphone and from a whiteboard microphone are obtained. In the described embodiment, the array microphone and the whiteboard microphone are both located at a location, e.g., a conference room, with the array microphone located substantially away from a whiteboard and the whiteboard microphone located in relatively close proximity to the whiteboard.

A determination is made in step 309 as to whether the signal from the whiteboard microphone indicates activity on the whiteboard, or noise associated with activity on the whiteboard. One method of determining whether the signal from the whiteboard activity indicates activity on the whiteboard will be discussed below with reference to FIG. 4. If the signal from the whiteboard microphone does not indicate activity on the whiteboard, then the indication is that the sound picked up by the whiteboard microphone is voice activity or other activity that is not activity on the whiteboard. As such, the process of analyzing sound from a whiteboard microphone is completed.

Alternatively, if it is determined in step 309 that the signal from the whiteboard microphone indicates activity on the whiteboard, process flow proceeds to step 313 in which it is determined if the signal from the whiteboard microphone indicates erasing noise. That is, it is determined in step 313 whether erasing of the whiteboard is indicated. If the determination in step 313 is that erasing noise is not indicated, the indication is that writing noise is indicated. As such, in step 321, the noise associated with activity on the whiteboard, or whiteboard noise, is identified as writing noise. In one embodiment, a detection threshold that corresponds to the detection of writing noise may be adjusted as appropriate, although it should be appreciated that a detection threshold may have a substantially default value that is not typically adjusted in step 321. After the whiteboard noise is identified as writing noise, the method of analyzing sound from a whiteboard microphone is completed.

Returning to step 313, if it is determined that the signal from the whiteboard microphone indicates erasing noise, then the whiteboard noise is identified as erasing noise in step 317. In one embodiment, a detection threshold that corresponds to the detection of erasing noise may be adjusted as appropriate, although it should be appreciated that a detection threshold may have a substantially default value that is not typically adjusted in step 317. Upon identifying the whiteboard noise as erasing noise, the method of analyzing sound from a whiteboard microphone is completed.

Figure 4:
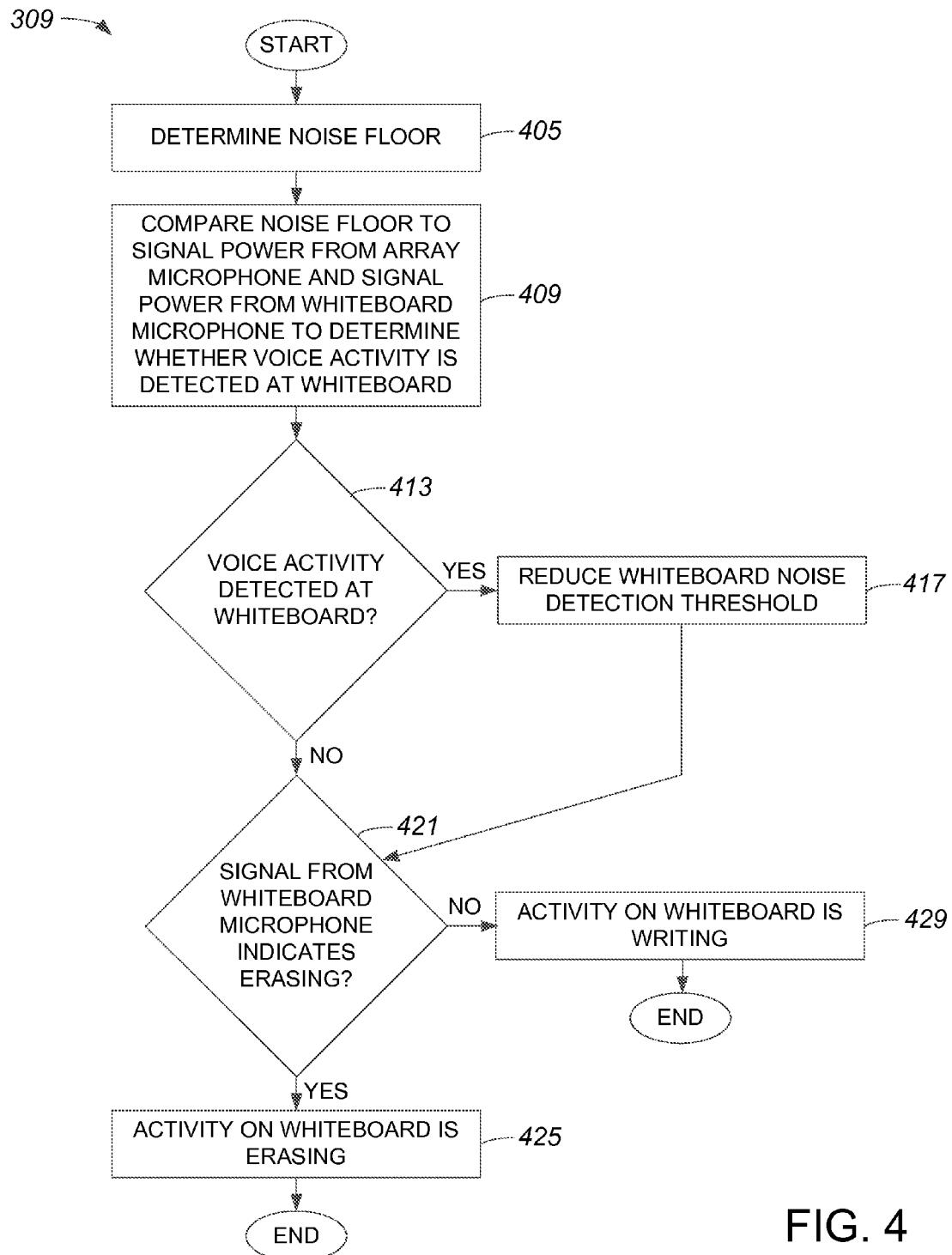
FIG. 4 is a process flow diagram which illustrates a method of determining whether a signal from a whiteboard microphone indicates activity on a whiteboard, e.g., step 309 of FIG. 3, in accordance with an embodiment.

FIG. 4 is a process flow diagram which illustrates a method of determining whether a signal from a whiteboard microphone indicates activity on a whiteboard, e.g., step 309 of FIG. 3, in accordance with an embodiment. A method 309 of determining whether a signal from a whiteboard microphone indicates activity on a whiteboard begins at step 405 in which a noise floor is determined.

As will be appreciated by those skilled in the art, a noise floor may be a substantially average noise level at a location, as for example in a room, when no one is speaking. In general, a noise floor may be substantially constant over time. Any suitable noise floor estimation method may be used to estimate a noise floor. For example, a slow up/fast down estimator may be used to estimate a noise floor. When a current sound signal level is higher than a previous estimated level, an estimate may effectively go up at a slow and fixed step. When a current sound signal level is lower than a previously estimated level, an estimate may go down faster and in proportion to an error between a new low level and a previous estimate.

In step 409, the noise floor is compared to the signal power from an array microphone and the signal power from a whiteboard microphone to determine whether voice activity is detected at a whiteboard. A determination is then made at step 413 as to whether voice activity is detected at the whiteboard. If it is determined that voice activity is detected at the whiteboard, a whiteboard noise detection threshold is reduced in step 417. Reducing the whiteboard noise detection threshold when voice activity is detected at the whiteboard effectively accounts for an increased likelihood that a whiteboard is being written on or being erased when there is someone speaking near the whiteboard. In other words, if a voice is detected in proximity to a whiteboard, a whiteboard noise detection threshold may be reduced as it may generally be more likely that a whiteboard is in use when a person is speaking hear the whiteboard.

After the whiteboard noise detection threshold is reduced in step 417, process flow moves to step 421 in which it is determined whether the signal from the whiteboard microphone indicates erasing noise. The signal from the whiteboard microphone may indicate erasing noise when narrow band noise, as for example noise between approximately three kiloHertz (KHz) and approximately five KHz, is detected. The narrow band noise may be generated by friction of an eraser as it is swiped on the surface of a whiteboard.

When the signal from the whiteboard microphone indicates erasing, activity on the whiteboard is identified as erasing activity in step 425. Once the activity on the whiteboard is identified as erasing activity, the method of determining whether a signal from a whiteboard microphone indicates activity on a whiteboard is completed. Alternatively, if the determination in step 421 is that the signal from the whiteboard does not indicate erasing, then the implication is that the activity on the whiteboard is writing activity. The signal from the whiteboard microphone may indicate writing noise when there is a click noise pulse associated with a pen or a marker tapping on the whiteboard and/or narrow band noise associated with the pen or the marker sliding across the whiteboard. A click noise pulse may have a spectrum of sliding noise in the range of approximately 500 Hertz (Hz) and approximately 800 Hz, while narrow band noise associated with a pen or a marker sliding across a whiteboard may have a spectrum of sliding noise in a range between approximately 3000 Hz and approximately 5000 Hz. When the signal from the whiteboard microphone indicates writing, the activity on the whiteboard is identified as writing activity in step 429, and the method of determining whether a signal from a whiteboard microphone indicates activity on a whiteboard is completed.

Returning to step 413, if it is determined that voice activity is not detected at the whiteboard, then the indication is that either erasing activity or writing activity has been detected. As such, process flow moves to step 421 in which it is determined whether the signal from the whiteboard microphone indicates erasing noise.

Systems, as for example control systems, used to identify noise activity associated with erasing a surface of a whiteboard and/or noise activity associated with writing on the surface of the whiteboard, and used to control a camera to zoom in on the surface of the whiteboard as appropriate may vary widely. With reference to FIGS. 5-9, examples of such systems will be described in accordance with an embodiment.

When a party, as for example a presenter, is using a whiteboard and speaking at the same time, some amount of the whiteboard noise activity may be obscured or substantially buried in a voice signal. In one embodiment, if whiteboard voice activity is detected, a noise detection threshold may be lowered to increase the likelihood that obscured or substantially buried whiteboard noise activity may be detected. As will be appreciated by those skilled in the art, a location such as a meeting room, both a whiteboard microphone and an array microphone may detect voice activity. Voice activity may generally be detected using any suitable method. When both a whiteboard microphone and an array microphone detect voice activity, the whiteboard microphone signal may be compared with the array microphone signal to determine whether the voice activity is occurring substantially in front of a whiteboard, e.g., whether the voice activity is speech uttered by a presenter standing at the whiteboard. To determine whether voice activity is occurring substantially in front of a whiteboard, relative signal strengths and signal arrival times of a whiteboard microphone signal and an array microphone signal may be compared.

Figure 5:
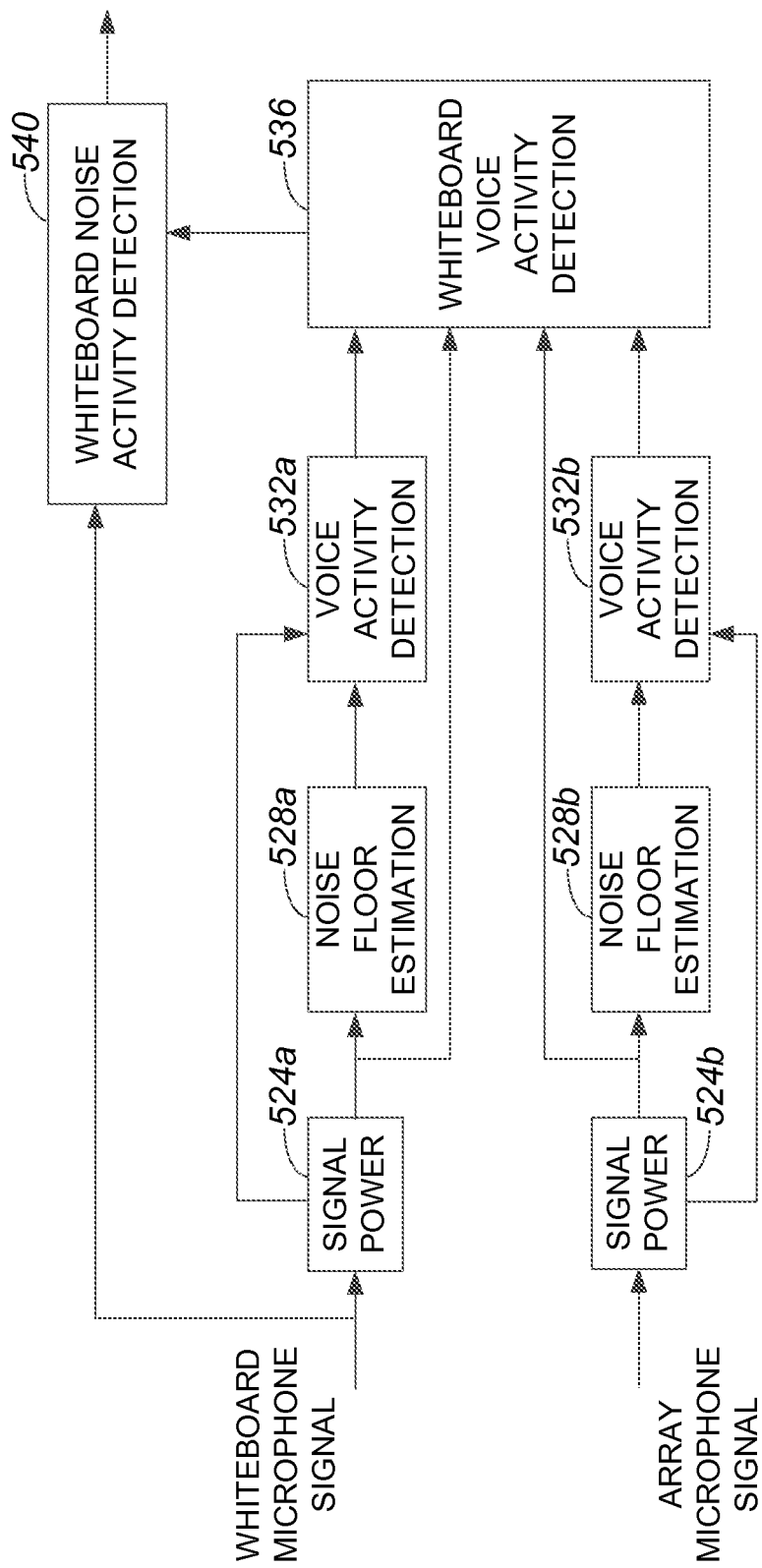
FIG. 5 is a diagrammatic representation of a system which processes microphone signals to determine if whiteboard activity is detected in accordance with an embodiment.

FIG. 5 is a diagrammatic representation of a system which processes microphone signals to determine if whiteboard activity is detected in accordance with an embodiment. A whiteboard microphone signal is processed by a signal power module 524a of the whiteboard microphone signal to determine a signal power of the whiteboard microphone signal, or to obtain an estimate of the signal power of the whiteboard microphone signal. Information from signal power module 524a of the whiteboard microphone signal is used by a noise floor estimation module 528a, a voice activity detection module 532a, and a whiteboard voice activity detection module 536. Noise floor estimation module 528a produces a noise floor estimation based on the estimated signal power, as for example using a low pass filter such as a fast-down/slow-up low pass filter. The noise floor estimation is also used by voice activity detection module 532a. For example, an output of noise floor estimation module 528a and an output of signal power module 524a may be used to determine whether any voice activity is detected by voice activity detection module 532a. That is, a noise floor estimation and a signal power of a whiteboard microphone signal may be used to determine whether any whiteboard voice activity is detected.

An array microphone signal, or a signal from a microphone that is relatively away from a whiteboard, is processed by a signal power module 524b to determine, e.g., to estimate, a signal power of the array microphone signal. Information relating to the signal power of the array microphone signal is used by a noise floor estimation module 528b, a voice activity detection module 532b, and whiteboard voice activity detection module 536. A noise floor estimated by noise floor estimation module 528b may be used by voice activity detection module 532b to ascertain whether voice activity is detected.

When voice activity is detected by voice activity detection module 532a and voice activity detection module 532b, the relative strengths of the whiteboard microphone signal and the array microphone signal are compared by whiteboard voice activity detection module 536 to detect whiteboard voice activity. That is, once signals are provided to whiteboard voice activity detection module 536, whiteboard voice activity detection module 536 determines whether there is voice activity detected in a collaboration environment, or a location associated with a collaboration session. Using information relating to whether voice activity is detected in proximity to a whiteboard, a whiteboard noise activity detection module 540 uses that information and the whiteboard microphone signal to determine whether whiteboard noise activity is present. As previously mentioned, at least one threshold used to determine whether a whiteboard microphone signal indicates the existence of whiteboard noise activity may be lowered if it is determined that there is voice activity in proximity to a whiteboard.

Figure 6:
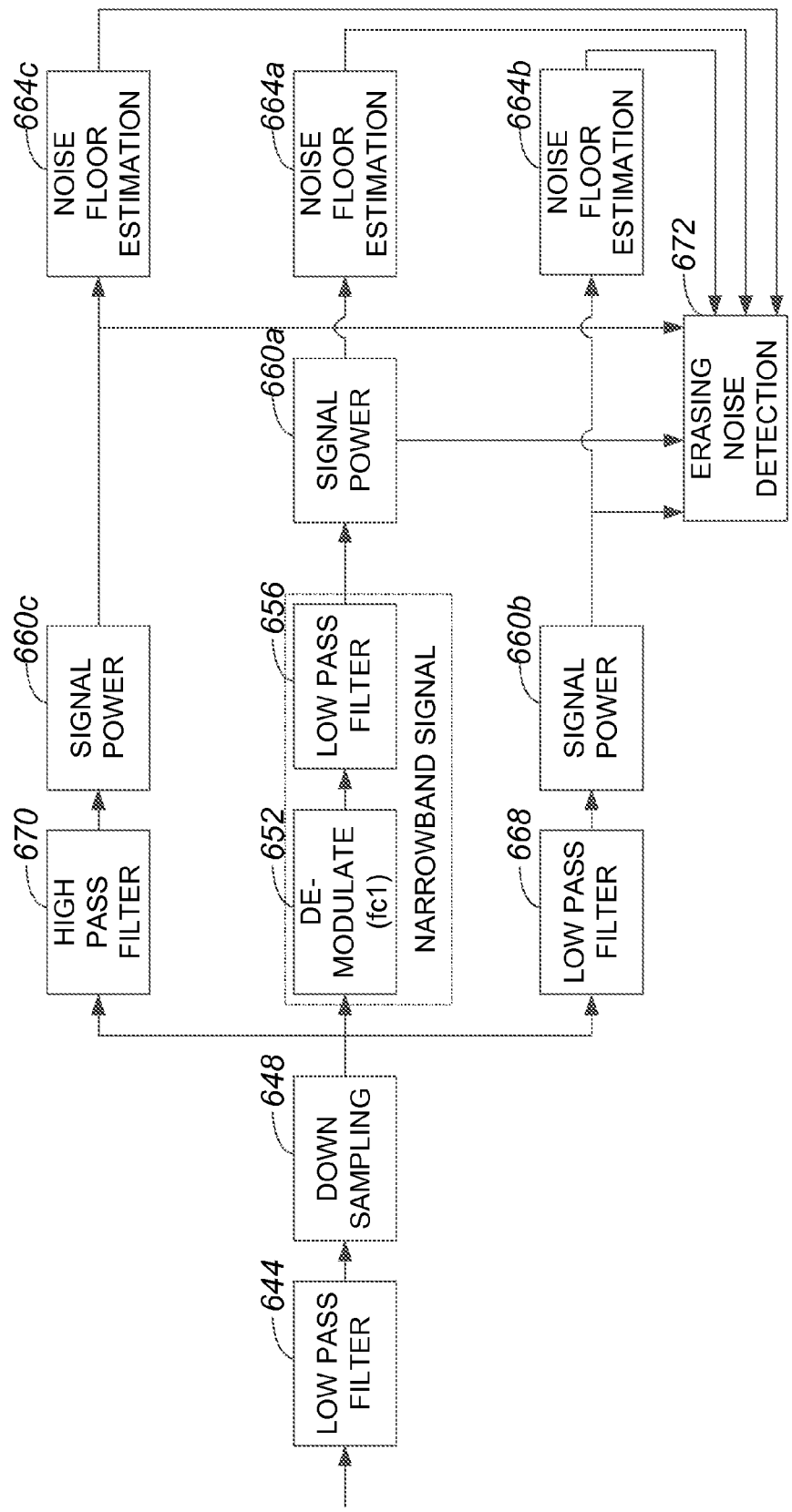
FIG. 6 is a diagrammatic representation of a system which processes a signal from a whiteboard microphone to determine if erasing noise is detected in accordance with an embodiment.

Whiteboard erasing noise detection is generally based on the detection of narrow band noise that is generated by contact, e.g., friction, of an eraser with a whiteboard. When an eraser is used to erase a surface of a whiteboard, the erase is often moved in a back- and forth motion. Narrow band noise may be associated with erasing a surface of a whiteboard may have frequencies between approximately three KHz and approximately five KHz. FIG. 6 is a diagrammatic representation of a system which processes a signal from a whiteboard microphone to determine if erasing noise is detected in accordance with an embodiment. A whiteboard microphone signal is provided to a low pass filter 644, and is then down sampled by a down sampling module 548. Down sampling may reduce the amount of computation needed to identify erasing noise within a whiteboard microphone signal. For instance, the signal provided by low pass filter 644 may be sampled at a sampling rate of approximately 48 kHz, and may be down sampled to approximately 12 kHz with a 4:1 down sampling rate.

A down sampled signal is provided to a high pass filter 670, a low pass filter 668, and a demodulator module 652. High pass filter 670, which is configured to isolate high frequency portions or signals of the down sampled signal, may be set with any suitable cut-off frequency. By way of example, high pass filter 670 may have a cut-off frequency of approximately 4.5 KHz such that frequencies in the down sampled signal that are greater than approximately 4.5 KHz may pass through high pass filter 670. Low pass filter 668 is configured to isolate low frequency portions or signals of the down sampled signal, and may have any suitable cut-off frequency, e.g., a cut-off frequency of approximately 3.5 KHz such that frequencies in the down sampled signal that are less than approximately 3.5 KHz may pass through low pass filter 668. Demodulator module 652 is arranged to demodulate the down sampled signal in order to identify a narrow band signal. Demodulator module 652 may demodulate the down sampled signal using any suitable frequency fc1. In one embodiment, demodulator module 652 may demodulate the down sampled signal using a demodulation frequency of approximately four KHz.

Relatively high frequency signals that pass through high pass filter 670 are provided to a signal power module 660c that estimates the signal power associated with the relatively high frequency signals. Similarly, relatively low frequency signals that pass through low pass filter 668 are provided to signal power module 660b that estimates the signal power associated with the relatively low frequency signals.

A demodulated signal is provided to demodulator module 652 to a low pass filter 656. In one embodiment, the cut-off frequency of low pass filter 656 may be approximately 500 Hz. The low frequency components of the demodulated signal which pass through low pass filter 656 are narrow band noise associated with the whiteboard microphone signal. Such a signal is generally associated with whiteboard erasing noise. The low frequency components of the demodulated signal, or the narrow band noise, are provided by low pass filter 656 to a signal power module 660a which estimates the signal power of the narrow band noise.

Signal powers are provided, by signal power modules 660*a-c*, to noise floor estimation modules 664*a-c* and to an erasing noise detection module 672. Noise floor estimation modules 664*a-c* may estimate the noise floor associated with the whiteboard microphone signal, and may be slow-up or fast-down low pass filters. The signal powers and the noise floor estimations may be used by erasing noise detection module 672 to estimate an envelope associated with erasing noise and to detect erasing noise.

Figure 7:
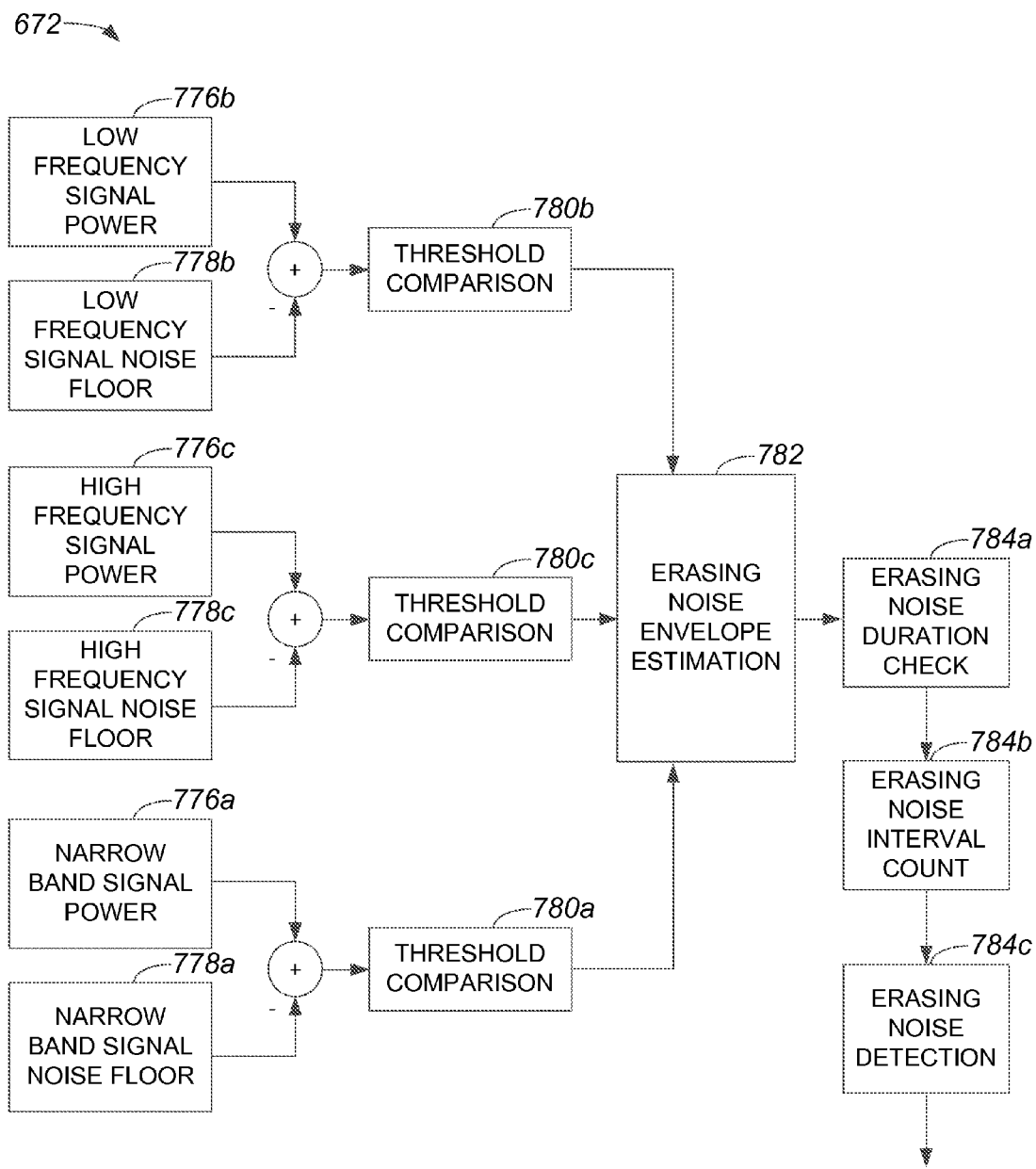
FIG. 7 is a diagrammatic representation of an erasing noise detection system, e.g., erasing noise detection module 672 of FIG. 6, in accordance with an embodiment.

FIG. 7 is a diagrammatic representation of an erasing noise detection system, e.g., erasing noise detection module 672 of FIG. 6, in accordance with an embodiment. Erasing noise detection module 672 obtains a low frequency signal power 776*b* and a low frequency signal noise floor 778*b* associated with a whiteboard microphone signal, e.g., from signal power module 660*b* and noise floor estimation module 664*b*, respectively, of FIG. 6. Low frequency signal power 776*b* and low frequency signal noise floor 778*b* are processed, as for example by subtracting low frequency signal noise floor 778*b* from low frequency signal power 776*b*, and compared to a corresponding threshold by a threshold comparison module 780*b*. Erasing noise detection module 672 obtains a high frequency signal power 776*c* and a low frequency signal noise floor 778*c* associated with a whiteboard microphone signal, e.g., from signal power module 660*c* and noise floor estimation module 664*c*, respectively, of FIG. 6. High frequency signal power 776*c* and low frequency signal noise floor 778*c* are processed and compared to a corresponding threshold by a threshold comparison module 780*c*. A high frequency signal power 776*c* and a low frequency signal noise floor 778*c* associated with a whiteboard microphone signal, e.g., from signal power module 660*c* and noise floor estimation module 664*c*, respectively, of FIG. 6. A narrow band signal power 776*a* and a narrow band signal noise floor 778*a* are obtained by erasing noise detection module 672, and are processed and then compared to a corresponding threshold by a threshold comparison module 780*a*.

In one embodiment, if threshold comparison module 780*b* determines that low frequency signal power 776*b* is lower than its corresponding threshold, if threshold comparison module 780*c* determines that high frequency signal power 776*c* is also lower than its corresponding threshold, and if threshold comparison module 780*a* determines that narrow band signal power 776*a* is above its associated threshold, then an envelope associated with narrow band signal power 776*a* is estimated by erasing noise envelope estimation module 782 to be an erasing noise envelope. A duration of the erasing noise envelope is effectively checked by erasing noise duration check module 784*a*, e.g., compared to predefined thresholds. An erasing noise interval count, or a number of erasing noise periods detected in a predetermined time interval, is effectively identified by erasing noise interval count module 784*b*. In one embodiment, an erasing noise period may be substantially defined as a period of erasing noise from a bottom to a peak to a bottom, and may generally be associated with a single swipe of an eraser on a surface of a whiteboard.

Erasing noise detection module 784 uses information provided by erasing noise duration check module 784*a* and erasing noise interval count module 784 to determine whether erasing noise is detected. In general, if the duration of the erasing noise envelope is determined by erasing noise detection module 784*c* as being too long or too short, the indication is that there is no erasing noise. The thresholds associated with determining whether the duration of an erasing noise envelope is too long or too short may vary widely. For example, an erasing noise envelope that has a duration of more than approximately 600 milliseconds (ms) may be considered to be too long, while an erasing noise envelope that has a duration of less than approximately 100 ms may be considered to be too short. If the erasing noise envelope indicates erasing noise, then erasing noise detection module 784*c* processes the erasing noise interval count obtained from erasing noise interval count module 784*b*. If erasing noise detection module 784*c* determines that the erasing noise interval count is higher than a predetermined time interval, then erasing noise is detected.

Figure 8:
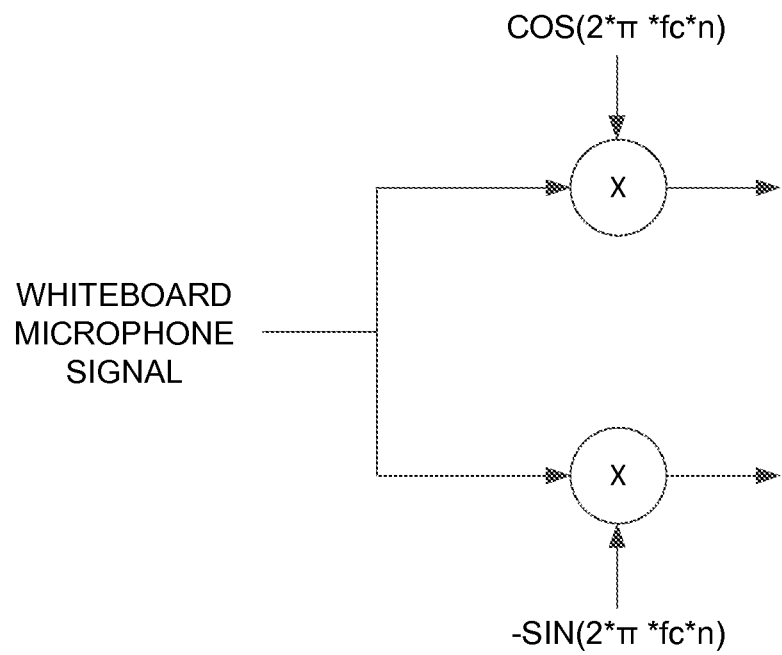
FIG. 8 is a diagrammatic representation of a control system arranged to demodulate a signal in accordance with an embodiment.

FIG. 8 is a diagrammatic representation of a control system arranged to demodulate a signal, e.g., demodulation module 652 of FIG. 6, in accordance with an embodiment. Demodulation module 652 is configured to obtain a whiteboard microphone signal, and to demodulate the whiteboard microphone signal at a frequency fc. As previously mentioned, frequency fc may be approximately four kHz. As will be appreciated by those skilled in the art, demodulation module 652 may be a demodulator that effectively multiplies an input signal with a sine signal and a cosine signal with a certain frequency fc.

As previously mentioned, writing noise includes substantially any noise associated with a writing instrument such as a marker contacting a surface of a whiteboard, as for example when writing characters and/or drawing diagrams. Writing noise detection may involve, in one embodiment, detecting a click noise pulse followed by narrowband noise. A click noise pulse generally occurs when a writing instrument taps on a whiteboard, e.g., when the writing instrument first contacts the whiteboard at the beginning of a writing stroke. Narrowband noise generally occurs when a writing instrument slides across a whiteboard.

Figure 9:
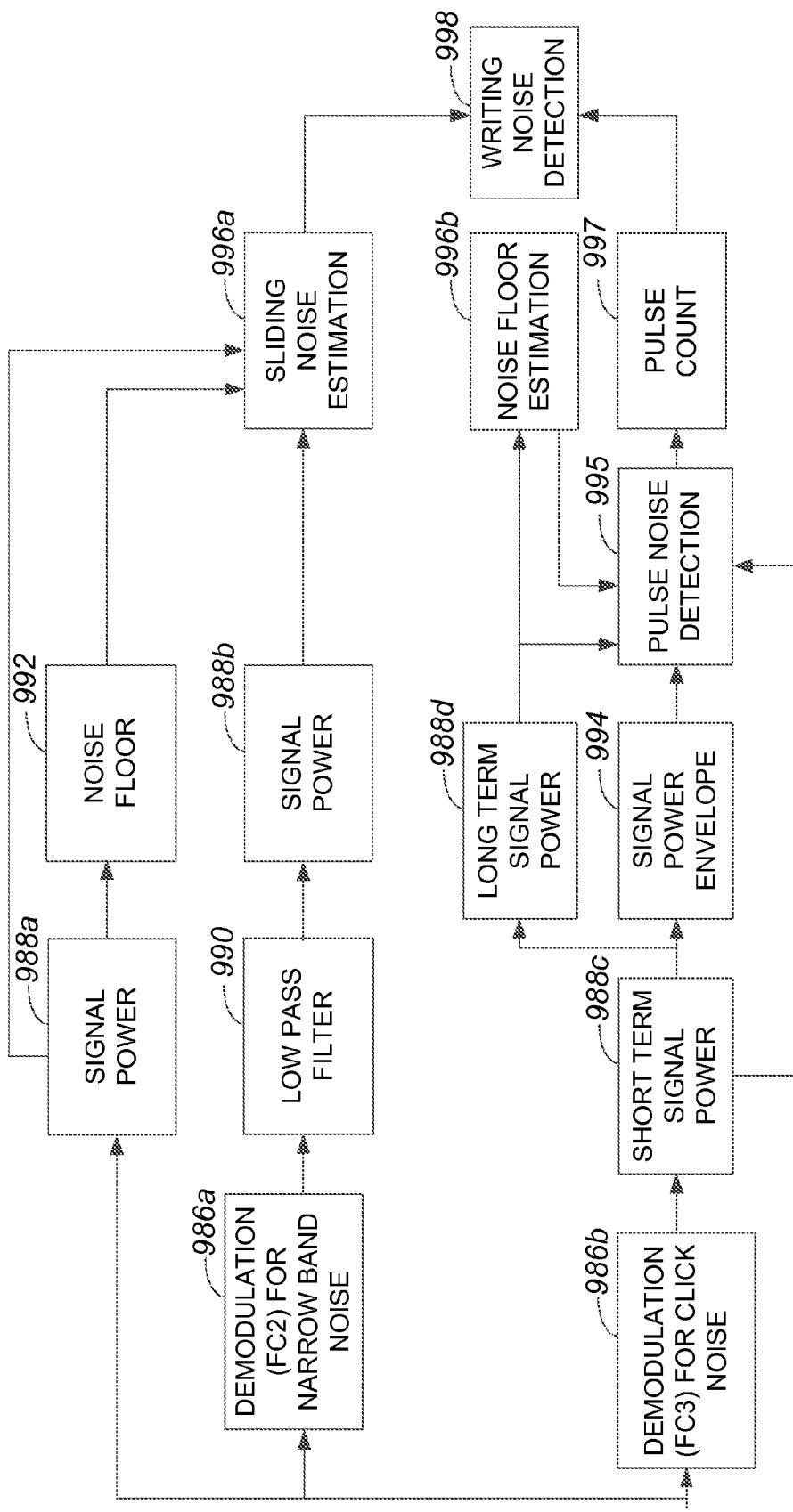
FIG. 9 is a diagrammatic representation of a system which processes a signal from a whiteboard microphone to determine if writing noise is detected in accordance with an embodiment.

Referring next to FIG. 9, a system which processes a signal from a whiteboard microphone to determine if writing noise is detected will be described in accordance with an embodiment. A whiteboard microphone signal is provided to demodulation module 986*a*, 986*b*, and to a signal power module 986*a* that is configured to estimate a signal power for the whiteboard microphone signal. The estimated signal power for the whiteboard microphone signal used by a noise floor determination module 992 that determines a noise floor.

Demodulation module 986*a* is arranged to demodulate the whiteboard microphone signal with a frequency fc2 for sliding noise or narrowband noise detection, while demodulation module 986*b* is arranged to demodulate the whiteboard microphone signal with a frequency fc3 for click noise detection. Although frequency fc2 and frequency fc1 may vary widely, in one embodiment, frequency fc2 may be approximately four KHz and frequency fc3 may be in a range between approximately 500 Hz and approximately 800 Hz. As will be appreciated by those skilled in the art, demodulating the whiteboard microphone signal may effectively reduce the likelihood that other noises are mistakenly identified as click noise or sliding noise. For example, demodulating the whiteboard microphone signal using demodulation module 986*b* may essentially prevent other pulse noises with different frequencies from being identified as click noise or as a click noise pulse which may have a frequency in the range of between approximately 500 Hz and approximately 800 Hz.

Once a signal is demodulated by demodulation module 986*a*, the demodulated signal is provided to a low pass filter 990. In the described embodiment, low pass filter 990 may have a cut-off frequency of approximately 500 Hz, although it should be understood that the cut-off frequency may vary. The signal power of the filtered, demodulated signal outputted by low pass filter 990 is estimated by a signal power module 988*b*. The signal power estimated by signal power determination module 988*a*, the noise floor determined by noise floor determination module 992, and the signal power estimated by signal power determination module 988*b* are provided to a sliding noise estimation module 996*a* that is configured to detect the sliding of a writing instrument on a surface of a whiteboard. In one embodiment, sliding noise is effectively detected by sliding noise estimation module 996*a* when a ratio of signal power estimated by signal power module 988*b* to signal power estimated by signal power module 988*a* is above a predefined threshold, and the signal power estimated by signal power module 988*b* is above the noise floor determined by noise floor determination module 992.

A signal demodulated by demodulation module 986*b* is provided to a short term signal power module 988*c*, which estimates a short term signal power accumulation. A long term signal power accumulation is estimated by a long term signal power module 988*d*, and a signal power envelope is determined by a signal power envelope determination module 994. The long term signal power accumulation is used by a noise floor estimation module 996*b* to estimate a noise floor.

The long term signal power accumulation and the short term signal power accumulation, as well as the estimated noise floor, are compared by a pulse noise detection module 995 to predefined thresholds to determine when click noise is detected. The output of pulse noise detection module 995 is provided to a pulse count module 997, to determine a number of pulse counts. In one embodiment, pulse noise detection module 995 detects a click noise pulse, and pulse count module 997 effectively counts how many clock noises are detected in a certain amount of time, e.g., in approximately two seconds. A click noise pulse may be detected if a short term signal power accumulation is approximately two ms and a long term signal power accumulation is approximately ten ms, and a duration of the pulse noise is approximately 60 ms or less. For example, a click noise pulse may reach its peak power within approximately two ms, and maintain a peak power for approximately four to five ms before the power decreases.

An output of sliding noise estimation module 996*a* and an output of pulse count module 997 are provided to a writing noise detection module 998. Writing noise detection module 998 compares durations between consecutive click noise pulses between predetermined thresholds. By way of example, when a number of click noise pulses detected in a certain amount of time is above a threshold, writing noise detection module 998 may detect writing noise. When the duration between consecutive click noise pulses is determined to be too short, e.g., less than a corresponding predetermined threshold, or too high, e.g., more than a corresponding predetermined threshold, it is determined that the click noise pulses are invalid. By way of example, if consecutive click noise pulses are spaced apart by less than approximately 150 ms or are spaced apart by more than approximately one second, then the click noise pulses may be determined not to be indicative of writing noise. Writing noise detection module 998 may also determine if a number of click noise pulses followed by sliding noses is above a particular predetermined threshold during a predetermined time interval, then writing noise is indicated. For instance, during a predefined time interval of approximately two seconds, if a number of click noise pulses followed by pen sliding noises is above a predetermined threshold, e.g., five, then writing noise may be detected. As will be appreciated by those skilled in the art, the various predetermined thresholds used to determine whether writing noise is detected may vary widely.

Figure 10:
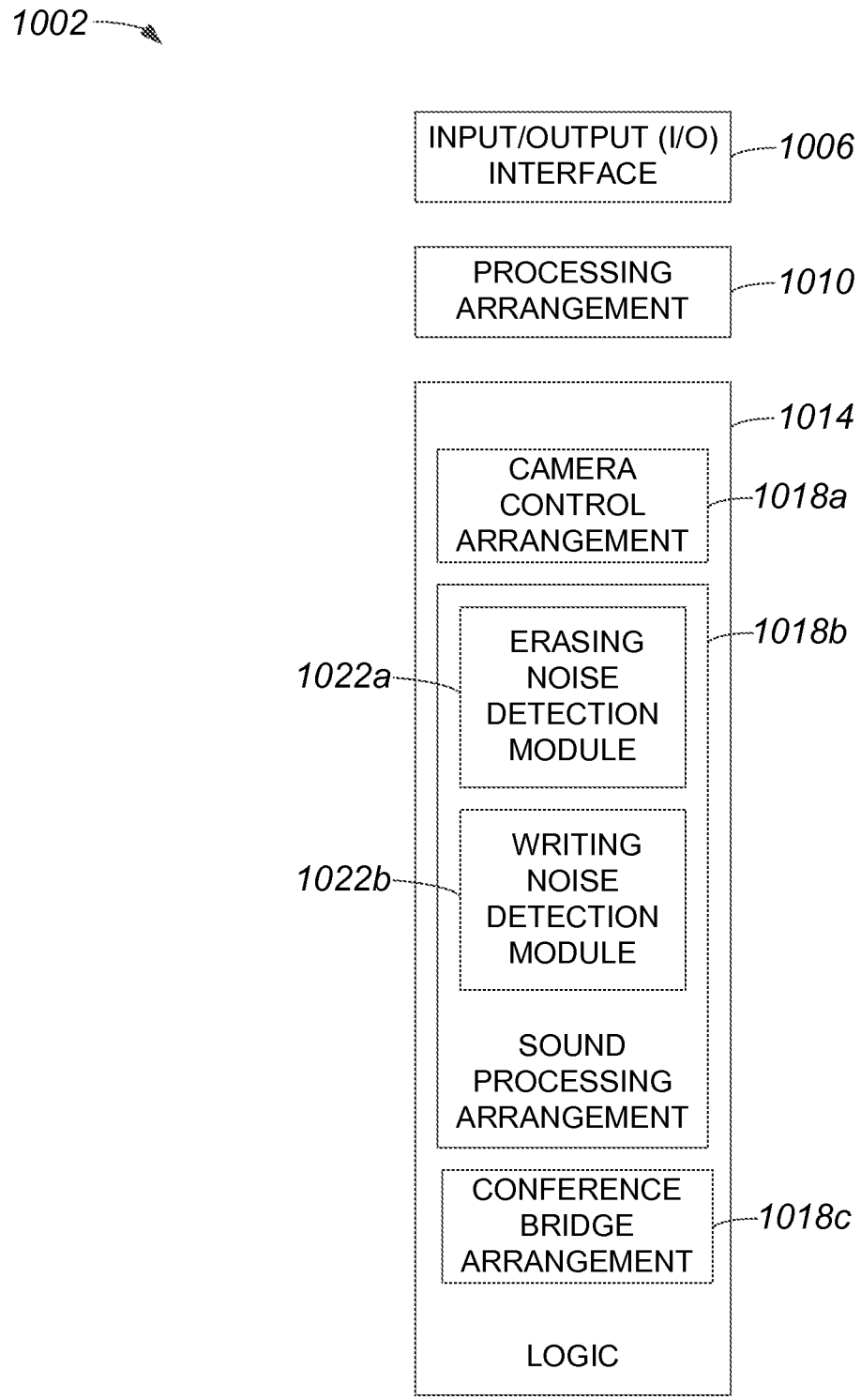
FIG. 10 is a block diagram representation of a server configured to determine when there is activity on a whiteboard and to control a camera to focus on the whiteboard when there is activity on the whiteboard in accordance with an embodiment.

FIG. 10 is a block diagram representation of a server configured to determine when there is activity on a whiteboard and to control a camera to focus on the whiteboard when there is activity on the whiteboard in accordance with an embodiment. A server 1002, which may be a conference server or a server that supports a collaboration session, generally includes an input/output (I/O) interface 1006, a processing arrangement 1010, and hardware and/or software logic 1014. As will be appreciated by those skilled in the art, server 1002 is generally part of an overall collaboration system that includes at least one camera (not shown) and a plurality of microphones (not shown), as well as a whiteboard (not shown).

I/O interface 1006, which may include at least one port (not shown) arranged to allow server 1002 to obtain information from a network and to provide information on the network. In general, I/O interface 1006 may obtain sound information from microphones (not shown) that allows server 1002 to determine whether activity on a whiteboard (not shown) is detected.

Processing arrangement 1010, which may include one or more processors (not shown), is arranged to execute software logic included in logic 1014. Logic 1014 includes a camera control arrangement 1018*a*, a sound processing arrangement 1018, and a conference bridge arrangement 1018*c*. Camera control arrangement 1018*a* is configured to position a camera (not shown), e.g., to focus on a whiteboard (not shown) when activity is detected on the whiteboard. Sound processing arrangement 1018*b* is configured to utilize data obtained through I/O interface 1006 to identify activity on a whiteboard (not shown). Sound processing arrangement 1018*b* includes an erasing noise detection module 1022*a* arranged to determine when data obtained through I/O interface 1006 indicates that erasing activity is likely occurring, and a writing noise detection module 1022*b* arranged to determine when data obtained through I/O interface 1006 indicates that writing activity is likely occurring. Conference bridge arrangement 1018*c* is configured to support a conference bridge or, more generally, a collaboration session.

Although only a few embodiments have been described in this disclosure, it should be understood that the disclosure may be embodied in many other specific forms without departing from the spirit or the scope of the present disclosure. By way of example, control systems used to effectively identify whether noise activity is detected by a whiteboard microphone and, further, whether detected noise activity is erasing noise or writing noise, may vary widely.

The thresholds set for low pass filters and/or high pass filters may vary widely without departing from the spirit or the scope of the present disclosure. In other words, cut-off frequencies for low pass filters and for high pass filters may vary depending upon the requirements of a particular system. In addition, the various thresholds used to determine whether erasing noise is detected and whether writing noise is detected may also vary depending upon the requirements of a particular system.

In some instances, activity at a whiteboard may include both writing and erasing at substantially the same time. For example, an individual using a whiteboard may alternate between writing and erasing. A method of detecting activity on a whiteboard may be augmented to include identifying alternating time periods during which writing noise is detected and time periods during which erasing noise is detected.

While the functionality associated with determining when activity has been detected on a surface of a whiteboard, or when noise activity indicates that a whiteboard is likely being used by a presenter, has been described as being embodied on a server, it should be appreciated that such functionality is not limited to being embodied on a server. By way of example, functionality that allows a determination to be made as to when a whiteboard is likely being used may be distributed throughout a network such that parts of the functionality are embodied on different elements or nodes within the network The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
   obtaining a first signal from a first microphone;
   determining when the first signal indicates activity on a first surface; and
   controlling a camera to focus on the first surface when it is determined that the first signal indicates the activity on the first surface.

2. The method of claim 1 wherein the first microphone and the camera are part of a collaboration system, and wherein the first surface is a surface of a whiteboard.

3. The method of claim 2 wherein when it is determined that the first signal indicates activity on the first surface, the method further includes:
   determining when the first signal indicates that the first surface is being erased, wherein when it is determined that the first signal does not indicate that the first surface is being erased, the first surface is being written on.

4. The method of claim 3 wherein determining when the first signal indicates that the first surface is being erased includes determining when the first signal indicates erasing noise, wherein the erasing noise is a first narrow band noise in a first range of frequencies.

5. The method of claim 4 wherein when the first surface is being written on, the first signal indicates one selected from a group including a click noise pulse and a second narrow band noise, the click noise pulse having a frequency in a second range of frequencies, the second narrow band noise being in a third range of frequencies.

6. The method of claim 2 wherein determining when the first signal indicates activity on the first surface includes determining when the first signal indicates voice activity near the first surface, wherein when the first signal indicates the voice activity near the first surface, at least one threshold used to determine when the first signal indicates activity on the first surface is lowered.

7. The method of claim 1 further including:
   obtaining a second signal from a second microphone, wherein determining when the first signal indicates activity on the first surface includes processing the second signal.

8. A tangible, non-transitory computer-readable medium comprising computer program code, the computer program code, when executed, configured to:
   obtain a first signal from a first microphone;
   determine when the first signal indicates activity on a first surface; and
   control a camera to focus on the first surface when it is determined that the first signal indicates the activity on the first surface.

9. The tangible, non-transitory computer-readable medium comprising computer program code of claim 8 wherein the first microphone and the camera are part of a collaboration system, and wherein the first surface is a surface of a whiteboard.

10. The tangible, non-transitory computer-readable medium comprising computer
    program code of claim 9 wherein when it is determined that the first signal indicates activity on the first surface, the computer program code is further configured to:
    determine when the first signal indicates that the first surface is being erased, wherein when it is determined that the first signal does not indicate that the first surface is being erased, the first surface is being written on.

11. The tangible, non-transitory computer-readable medium comprising computer program code of claim 10 wherein the computer program code configured to determine when the first signal indicates that the first surface is being erased is further configured to determine when the first signal indicates erasing noise, wherein the erasing noise is a first narrow band noise in a first range of frequencies.

12. The tangible, non-transitory computer-readable medium comprising computer program code of claim 11 wherein when the first surface is being written on, the first signal indicates one selected from a group including a click noise pulse and a second narrow band noise, the click noise pulse having a frequency in a second range of frequencies, the second narrow band noise being in a third range of frequencies.

13. The tangible, non-transitory computer-readable medium comprising computer program code of claim 9 wherein the computer program code configured to determine when the first signal indicates activity on the first surface is further configured to determine when the first signal indicates voice activity near the first surface, wherein when the first signal indicates the voice activity near the first surface, at least one threshold used to determine when the first signal indicates activity on the first surface is lowered.

14. The tangible, non-transitory computer-readable medium comprising computer program code of claim 8 wherein the computer program code is further configured to:
    obtain a second signal from a second microphone, wherein the computer program code configured to determine when the first signal indicates activity on the first surface is configured to process the second signal.

15. An apparatus comprising:
    an input/output (I/O) interface, the I/O interface arranged to obtain a first audio signal from a whiteboard microphone;

a camera control arrangement, the camera control arrangement configured to cause movement of a camera to be controlled; and a sound processing arrangement, the sound processing arrangement being configured to process at least the first audio signal to determine if the first signal indicates activity on a whiteboard, wherein the camera control arrangement is arranged to cause the movement of the camera to be controlled to focus on the whiteboard when the first audio signal indicates the activity on the whiteboard.

16. The apparatus of claim 15 wherein the sound processing arrangement is configured to process at least the first audio signal to determine if the first signal indicates the activity on the whiteboard by identifying at least one selected from a group including erasing noise and writing noise.

17. The apparatus of claim 16 wherein the I/O interface is further arranged to obtain a second audio signal from an array microphone, wherein the sound processing arrangement is further configured to process the second audio signal to determine if the first audio signal indicates the activity on the whiteboard.

18. The apparatus of claim 16 wherein the sound processing arrangement is configured to estimate a noise floor using at least the first audio signal and to use the estimate of the noise floor in addition to a signal power associated with the first audio signal to identify erasing noise.

19. The apparatus of claim 15 further including:

a conference bridge arrangement, the conference bridge arrangement being configured to support a conference session, wherein the first audio signal obtained from the whiteboard microphone is obtained during the conference session.

20. The method of claim 7 wherein the second microphone is configured to detect voice activity, and wherein processing the second signal includes processing the second signal to determine whether the voice activity is occurring in front of the first surface.

* * * * *